United States Patent
Iwamoto et al.

[11] Patent Number: 5,969,905
[45] Date of Patent: Oct. 19, 1999

[54] FLEXURE BIAS-FREE END LIFT SUSPENSION

[75] Inventors: Alejandro Koji Iwamoto; Amanullah Khan, both of Temecula; Warren Coon, Poway, all of Calif.

[73] Assignee: Magnecomp Corporation, Temecula, Calif.

[21] Appl. No.: 09/022,648

[22] Filed: Feb. 12, 1998

[51] Int. Cl.⁶ .................................................. G11B 5/60
[52] U.S. Cl. ............................................................ 360/104
[58] Field of Search ................................... 360/104, 108

[56] References Cited

U.S. PATENT DOCUMENTS

| | | | |
|---|---|---|---|
| 3,931,641 | 1/1976 | Watrous | 360/104 |
| 4,286,297 | 8/1981 | Root et al. | 360/103 |
| 4,903,156 | 2/1990 | Hayashi et al. | 360/104 |
| 4,954,919 | 9/1990 | Yamada | 360/104 |
| 5,353,181 | 10/1994 | Frater et al. | 360/104 |
| 5,602,699 | 2/1997 | Khan | 360/104 |
| 5,612,841 | 3/1997 | Johnson | 360/104 |
| 5,711,063 | 1/1998 | Budde et al. | 29/603.03 |
| 5,734,526 | 3/1998 | Symons | 360/104 |
| 5,739,982 | 4/1998 | Arya et al. | 360/104 |
| 5,838,517 | 11/1998 | Frater et al. | 360/104 |
| 5,856,896 | 1/1999 | Berg et al. | 360/104 |

*Primary Examiner*—William J. Klimowicz
*Attorney, Agent, or Firm*—Louis J. Bachand

[57] ABSTRACT

A liftable disk drive suspension load beam of spring steel comprises a base portion, a spring portion, an elongated beam portion having left and right edge rails, and a lift tip beyond the elongated beam portion. The beam portion has a longitudinally disposed flexure support tongue defining an attachment locus for attaching a flexure in cantilevered relation and having a situs for gimballing dimple contact with the flexure. The beam portion has left and right continued extents on either side of the tongue, these continued extents being, free of connection to said the support tongue fore and aft of the flexure attachment locus, the extents being joined beyond the attachment locus to support the lift tip from the elongated beam portion. The flexure tongue provides the flexure freedom of gimballing movement free of interference from the lift tip and the continued extents.

13 Claims, 2 Drawing Sheets

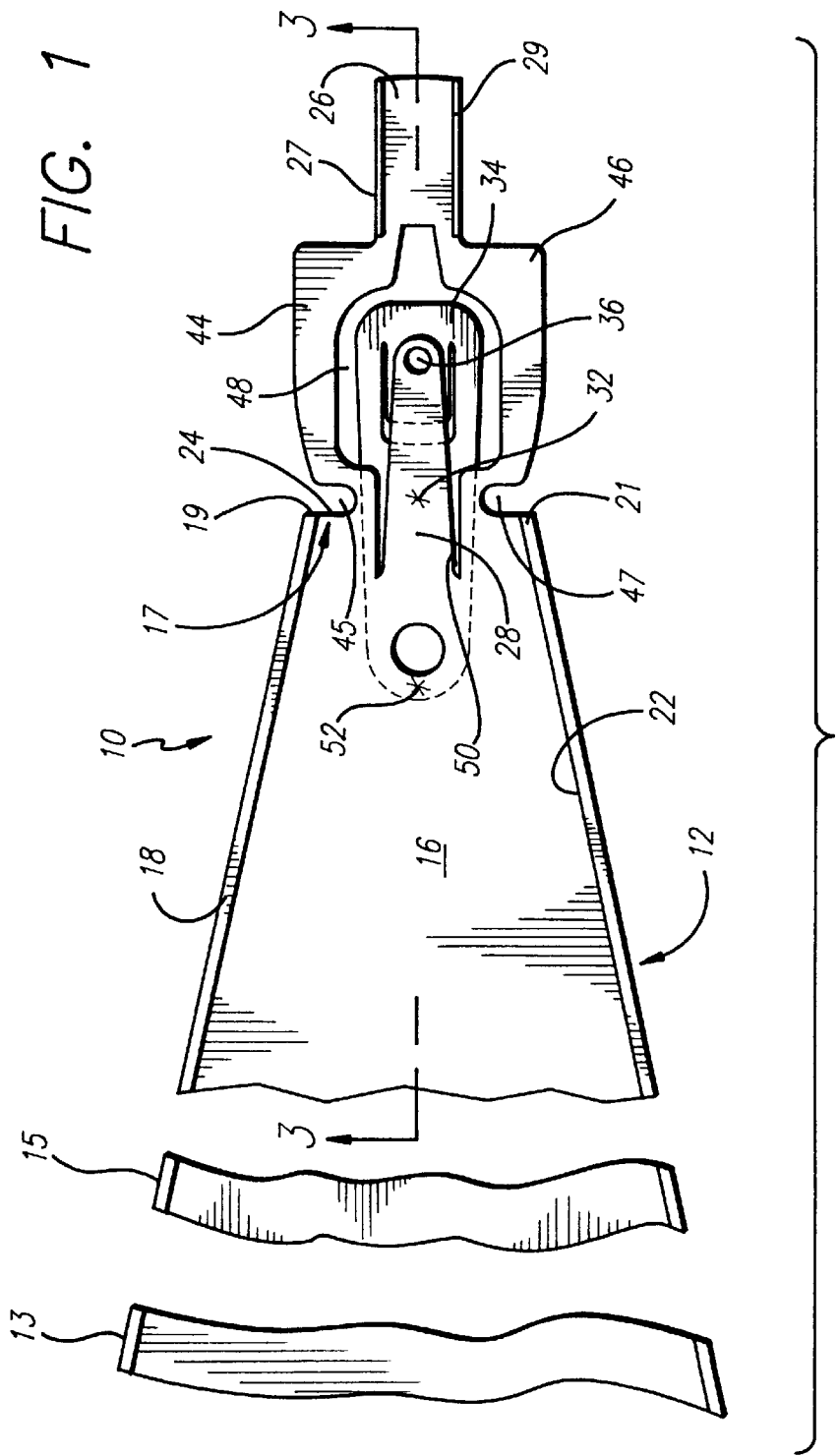

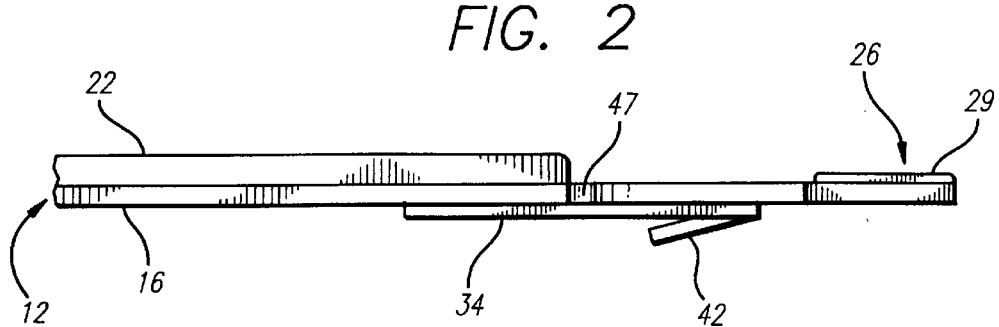
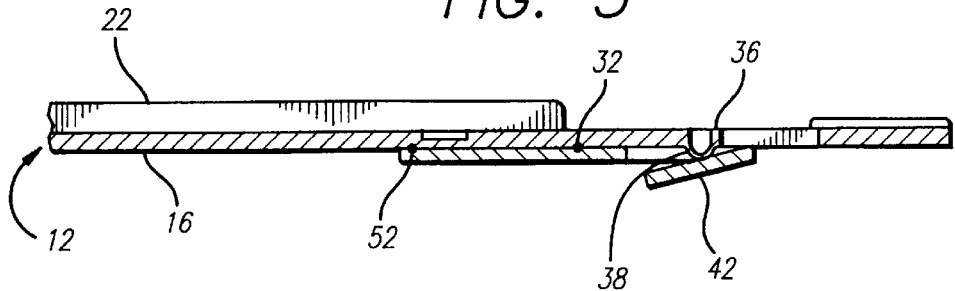

FLEXURE BIAS-FREE END LIFT SUSPENSION

REFERENCE TO RELATED APPLICATION

Not Applicable.

FIELD OF THE INVENTION

This invention has to do with disk drive suspensions, and more particularly with load beams for disk drive suspension. More particularly, the invention relates to load beams having an improved lifting feature. In general, the invention load beams have a lift feature which is small in dimension, light in weight, located at the tip of the load beam and that does not unduly increase load beam mass. Further, the invention load beams are constructed and arranged to provide a lifting locus without biasing the flexure by decoupling the flexure support tongue from the load beam continued extents that support the lift tip.

BACKGROUND OF THE INVENTION

The loading and unloading of the slider or other read write device from a disk drive disk surface involves the lifting of the suspension carrying the device relative to the disk surface. This has been accomplished by lifting at the middle of the suspension or at the distal end. Generally, previous efforts whether at the middle or the end of the suspension are not easy to manufacture. Where ramps are used in the middle of the suspension for example, for relative displacement of the suspension and the ramp cam surface, added mass may affect suspension dynamics and interfere with the suspension load beam body. The distal or front-end lift technique also uses a ramp or cam that engages the lift tip projecting from the suspension. This type of lift has been criticized for adverse effects on the gimballing movement of the slider under the flexure. The flexure tongue has in previous efforts at a front lift experienced a bias at the dimple engaging the slider from the physical association of the tongue with the lift tip support. In manufacturing, formation of the lifter may adversely affect pitch and roll static attitude change and flatness. The presence of the lift tip may interfere with the flexure movement. In either case, previously known distal end lift tips have unduly limited performance of the suspension.

SUMMARY OF THE INVENTION

It is an object therefore of the present invention to provide a distal end lift tip for a suspension in which problems of the prior art are avoided. It is a further object to provide a novel distal lift tip for a disk drive suspension. A further object is to provide an end lift tip formed in a manner as to avoid biasing the flexure tongue and flexure. Yet another object is to provide a front end-lift feature in a suspension load beam free of change in pitch static and roll static attitudes. A further object is to provide a novel disk drive suspension having a lift tip supported by load beam continued extents that are free of coupling to the flexure support tongue and do not bias the tongue.

These and other objects of the invention to become apparent hereinafter, are realized in liftable disk drive suspension load beam comprising a base portion, a spring portion, an elongated beam portion, and a lift tip beyond the elongated beam portion; the beam portion having a longitudinally disposed flexure support tongue defining an attachment locus for attaching a flexure in cantilevered relation and having a situs for gimballing dimple contact with the flexure, the beam portion having left and right continued extents on either side of the tongue, the continued extents being free of connection to the flexure support tongue fore and aft of the flexure attachment locus, the extents being joined beyond the attachment locus to support the lift tip from the elongated beam portion, the flexure tongue providing the flexure freedom of gimballing movement free of interference from the lift tip and the continued extents.

In this and like embodiments, typically, the load beam portions, the continued extents and the lift tip are unitary and formed from a common web of metal, the flexure support tongue is formed along the longitudinal axis of the load beam, the tongue-defined flexure attachment locus is a second flexure attachment locus, the elongated beam portion defining a first attachment locus inboard of the second attachment locus and the flexure support tongue, the elongated beam portion has a distal terminus and defines left and right edge rails each having a distal terminus adjacent the beam portion distal terminus, the left and right continued extents projecting beyond the beam portion distal terminus to support the lift tip and/or the left and right continued extents have respective reduced width sections between the lift tip and the beam portion distal terminus.

In a particularly preferred embodiment, the invention provides a liftable disk drive suspension load beam of spring steel and comprising a base portion, a spring portion, an elongated beam portion having left and right edge rails, and a lift tip beyond the elongated beam portion; the beam portion having a longitudinally disposed flexure support tongue defining an attachment locus for attaching a flexure in cantilevered relation and having a situs for gimballing dimple contact with the flexure, the beam portion having left and right continued extents on either side of the tongue, the continued extents being free of connection to the flexure support tongue fore and aft of the flexure attachment locus, the extents being joined beyond the attachment locus to support the lift tip from the elongated beam portion, the flexure tongue providing the flexure freedom of gimballing movement free of interference from the lift tip and the continued extents.

In this and like embodiments, typically, the continued extents and the lift tip are unitary and formed from a common web of stainless spring steel, the flexure support tongue is formed along the longitudinal axis of the load beam, the tongue-defined flexure attachment locus is a second flexure attachment locus, the elongated beam portion defining a first attachment locus inboard of the second attachment locus and the flexure support tongue, the elongated beam portion has a distal terminus, the left and right continued extents projecting beyond the beam portion distal terminus circumferentially of the flexure to support the lift tip, the left and right continued extents have respective reduced width sections between the lift tip and the beam portion distal terminus, and the lift tip has left and right edge rails.

BRIEF DESCRIPTION OF THE DRAWINGS

The invention will be further described in conjunction with the attached drawings in which:

FIG. 1 is a plan view of a liftable suspension load beam according to the invention FIG. 2 is a side elevation view thereof; and, FIG. 3 is a view taken on line 3—3 in FIG. 1.

DETAILED DESCRIPTION OF THE INVENTION

The lift tip in the invention liftable suspension is applicable to suspensions in which the flexure is welded to the cantilevered tongue of the load beam and gimbals about a dimple on the flexure or on the flexure tongue portion of the load beam supporting a slider adjacent a disk surface. In the invention, the lift tip supports start before the locus of weld attachment of the flexure to the lad beam flexure support tongue. The load beam blank is etched or otherwise shaped to divide the tip support continued extents of the load beam from the load beam tongue-defining portion between such extents with elongated gaps that free the flexure support tongue for greater flexibility of movement while also affording support for an effective lift tip.

With reference to FIGS. 1–3, the liftable suspension 10 comprises load beam 12. Load beam 12 has a base portion 13 and a spring portion 15 of conventional design, and cantilevered therefrom an elongated beam portion 16 of generally triangular shape and having left and right edge rails 18, 22 terminating at the distal end 24 of the beam portion. The suspension 10 has a lift tip 26 beyond the elongated beam portion 16. Beam portion 16 is shaped to define a longitudinally disposed flexure support tongue 28. Tongue 28 defines along its longitudinal axis an attachment locus 32 for weld (or adhesive) attaching flexure 34 in cantilevered relation. Flexure support tongue 28 further defines on its longitudinal axis a situs 36 for gimballing dimple contact with the flexure 34. In the drawing the flexure 34 is formed with a dimple 38 for the gimballing contact with dependent flexure portion 42. The dimple 38 can be formed on the dependent flexure portion 42 and ride on the flexure 34 opposite thereto, as well.

To support the lift tip 26, the beam portion is cut, etched, or otherwise formed to have left and right continued extents 44, 46 on either side of the flexure support tongue 28, as shown. The elongated beam portion 16 has a distal terminus 17 at the terminals 19, 21 of its left and right edge rails 18, 22, and therebeyond, the left and right continued extents 44, 46 projecting beyond the beam portion distal terminus circumferentially of the flexure 34 and flexure tongue 28 to support the lift tip. Typically, beam portion left and right continued extents 44, 46 have respective reduced width sections 45, 47 between the lift tip 26 and the beam portion distal terminus 17, as shown. The lift tip 26 is typically formed with left and right edge rails 27, 29 as well.

It will be noted that the beam portion continued extents 44, 46 are free of connection to the flexure support tongue 28 both fore, area 48, and aft, area 52, of the flexure attachment locus 32. The continued extents 44, 46 are joined beyond the attachment locus 32 to support the lift tip 26 from the elongated beam portion 16. The flexure support tongue 28 is thus constructed and arranged to provide the flexure 34 freedom of gimballing movement about dimple 38 free of interference from the lift tip 26 and the continued extents 44, 46.

The tongue 28-defined flexure attachment locus 32 may be considered a second flexure attachment locus in position along the longitudinal axis of the beam portion 16, The elongated beam portion 16 further defines a further and first attachment locus 52 inboard of the attachment locus 32. The flexure support tongue 28 is further welded or adhered to the load beam portion at locus 52.

Preferably, the load beam portion continued extents 44, 46, and the lift tip 26 are formed from a common web of said stainless spring steel as is the balance of the load beam 12.

The invention described provides a distal end lift tip for a suspension formed in a manner to avoid biasing the flexure tongue and flexure, and avoid creating adverse changes in pitch static and roll static attitudes, the lift tip being supported by load beam continued extents that are free of coupling to the flexure support tongue and that do not bias the tongue or flexure.

The foregoing objects are thus met.

We claim:

1. A liftable disk drive suspension comprising a load beam comprising a base portion, a spring portion, and an elongated beam portion;

a flexure separately formed from said load beam elongated beam portion and attached thereto in a separate plane, said elongated load beam portion having edge rails each having a distal terminus and a longitudinally disposed flexure support tongue, said flexure support tongue being cantilevered from said beam portion before said distal terminus of said edge rails and having a free end beyond said distal terminus of said edge rails, said flexure support tongue free end defining a situs for gimballing dimple contact with said flexure, said beam portion having left and right continued extents on either side of said flexure support tongue free end, said continued extents having distal ends joined at a junction free of attachment to said flexure support tongue and opposite and spaced from said flexure support tongue free end, and a lift tip attached to said junction, whereby said continued extents support said lift tip from said elongated beam portion, said flexure support tongue providing said flexure freedom of gimballing movement free of interference from said lift tip and said continued extents.

2. The liftable disk drive suspension according to claim 1, in which said load beam portions, said continued extents, and said lift tip are unitary one with another and formed from a common web of metal.

3. The liftable disk drive suspension according to claim 1, in which said flexure support tongue is formed along the longitudinal axis of said load beam.

4. The liftable disk drive suspension according to claim 1, in which said flexure support tongue defines a first flexure attachment locus and said elongated beam portion defines a second flexure attachment locus, said elongated beam portion-defined second attachment locus being inboard of said flexure support tongue-defined first attachment locus and said flexure support tongue.

5. The liftable disk drive suspension according to claim 1, in which said elongated beam portion has a distal terminus, said left and right continued extents projecting beyond said beam portion distal terminus to support said lift tip.

6. The liftable disk drive suspension according to claim 5, in which said left and right continued extents have respective reduced width sections between said lift tip and said beam portion distal terminus.

7. A liftable disk drive suspension comprising a load beam of stainless spring steel and comprising a base portion, a spring portion, an elongated beam portion having left and right edge rails, a separate flexure, and a lift tip beyond said elongated beam portion; said beam portion having a longitudinally disposed flexure support tongue cantilevered outward from a locus on said elongated beam portion and having a free distal end, said flexure support tongue supporting said flexure in cantilevered relation and having a situs for gimballing dimple contact with said flexure, said beam portion commencing forward of said locus having left and right continued extents on either side of said tongue, said continued exents being free of connection to said flexure support tongue and joined beyond said flexure support tongue to support said lift tip, said flexure support tongue providing said flexure freedom of gimballing movement free of interference from said lift tip and said continued extents.

8. The liftable disk drive suspension according to claim 7, in which said load beam portions, said continued extents and said lift tip are unitary and formed from a common web of said stainless spring steel.

9. The liftable disk drive suspension according to claim 8, in which said flexure support tongue is formed along the longitudinal axis of said load beam.

10. The liftable disk drive suspension according to claim 9, in which said flexure is weld-attached to said flexure support tongue.

11. The liftable disk drive suspension according to claim 9, in which said elongated beam portion has a distal terminus, said left and right continued extents projecting beyond said beam portion distal terminus and extending circumferentially of said flexure to support said lift tip.

12. The liftable disk drive suspension according to claim 11, in which said left and right continued extents have respective reduced width sections between said lift tip and said beam portion distal terminus.

13. The liftable disk drive suspension according to claim 12, in which said lift tip has left and right edge rails.

* * * * *